US012628721B2

(12) United States Patent
Hiddema et al.

(10) Patent No.: US 12,628,721 B2
(45) Date of Patent: May 19, 2026

(54) METHOD FOR CULTIVATING A PIECE OF SLOPING FARMLAND, AND A METHOD AND SYSTEM FOR GENERATING A CULTIVATION PLAN

(71) Applicant: Agxeed Holding B.V., Oirlo (NL)

(72) Inventors: Joris Jan Hiddema, Grubbenvorst (NL); Laurentius Hubertus Margaretha Schmitz, Mariahoop (NL)

(73) Assignee: AGXEED HOLDING B.V., Oirlo (NL)

( * ) Notice: Subject to any disclaimer, the term of this patent is extended or adjusted under 35 U.S.C. 154(b) by 38 days.

(21) Appl. No.: 18/715,924

(22) PCT Filed: Dec. 8, 2022

(86) PCT No.: PCT/NL2022/050707
§ 371 (c)(1),
(2) Date: Jun. 3, 2024

(87) PCT Pub. No.: WO2023/106920
PCT Pub. Date: Jun. 15, 2023

(65) Prior Publication Data
US 2025/0031599 A1     Jan. 30, 2025

(30) Foreign Application Priority Data

Dec. 9, 2021    (NL) ..................................... 2030091

(51) Int. Cl.
*A01B 69/04*         (2006.01)
(52) U.S. Cl.
CPC .................................. *A01B 69/008* (2013.01)

(58) Field of Classification Search
None
See application file for complete search history.

(56) References Cited

U.S. PATENT DOCUMENTS

| | | | |
|---|---|---|---|
| 10,474,153 B2 | 11/2019 | Matsuzaki et al. | |
| 11,144,055 B2 * | 10/2021 | Oetken ................ | G05D 1/0274 |
| 2004/0068352 A1 * | 4/2004 | Anderson ............ | G05D 1/0219 |
| | | | 701/25 |

(Continued)

FOREIGN PATENT DOCUMENTS

| | | | |
|---|---|---|---|
| DE | 19544112 A1 | 5/1997 | |
| EP | 1406140 A2 * | 4/2004 | ............. G01S 19/14 |

(Continued)

*Primary Examiner* — Shelley Chen
(74) *Attorney, Agent, or Firm* — Richard M. Goldberg

(57) ABSTRACT

A method for cultivating a piece of sloping farmland using an autonomous agricultural vehicle for performing an agricultural operation to attain the cultivating, the method including generating a cultivation plan for the piece of farmland, which plan includes multiple contiguous paths that extend over the piece of farmland, which paths are to be crossed by the autonomous vehicle in a predetermined order, and after the plan has been generated, controlling the autonomous vehicle such that it crosses the land by moving over each of the multiple contiguous paths according to the predetermined order, wherein a predetermined direction of movement of the autonomous vehicle over each of the paths depends on an angle of inclination of the each of these paths.

8 Claims, 1 Drawing Sheet

(56)            References Cited

U.S. PATENT DOCUMENTS

| | | | |
|---|---|---|---|
| 2004/0193349 A1 * | 9/2004 | Flann | A01B 69/008 |
| | | | 701/50 |
| 2020/0033143 A1 * | 1/2020 | Hiramatsu | G05D 1/228 |
| 2020/0089230 A1 * | 3/2020 | Oetken | E02F 9/205 |
| 2020/0174491 A1 * | 6/2020 | Boydens | G06Q 10/04 |
| 2020/0240111 A1 * | 7/2020 | Saiki | G08G 1/0969 |
| 2021/0168989 A1 | 6/2021 | Leeb | |

FOREIGN PATENT DOCUMENTS

| | | | | |
|---|---|---|---|---|
| EP | 3567446 A1 * | 11/2019 | | A01B 69/008 |
| EP | 3695694 A1 * | 8/2020 | | A01D 34/008 |
| EP | 3695700 A1 * | 8/2020 | | A01D 34/008 |
| EP | 3695700 B1 * | 11/2024 | | A01D 34/008 |
| JP | 8280207 | 11/2004 | | |
| JP | 2017182376 A * | 10/2017 | | G05D 1/0219 |
| JP | 2018120491 A * | 8/2018 | | A01B 69/008 |
| JP | 6663366 B2 * | 3/2020 | | A01B 69/008 |
| KR | 102272676 B1 * | 7/2021 | | B25J 11/00 |
| WO | WO-2017169373 A1 * | 10/2017 | | A01B 69/008 |
| WO | WO-2019082692 A1 * | 5/2019 | | G01C 21/34 |

* cited by examiner

METHOD FOR CULTIVATING A PIECE OF SLOPING FARMLAND, AND A METHOD AND SYSTEM FOR GENERATING A CULTIVATION PLAN

GENERAL FIELD OF THE INVENTION

The present invention pertains to a method for cultivating a piece of sloping farmland using an autonomous agricultural vehicle for performing an agricultural operation to attain said cultivating, the method comprising generating a cultivation plan for the piece of farmland, which plan comprises multiple contiguous paths that extend over the piece of farmland, which paths are to be crossed by the autonomous vehicle in a predetermined order, and after the plan has been generated, controlling the autonomous vehicle such that it crosses the land by moving over each of the multiple contiguous paths according to the predetermined order. The invention also pertains to a method and system for generating a cultivation plan for such an autonomous vehicle.

BACKGROUND OF THE INVENTION

The adoption of technology in agriculture has improved the approaches that farmers use in the farmland nowadays. Modern agriculture has made it easy for farmers to achieve high produce while using less input, in particular less labour. According the trends in the use of technology in agriculture, there are high concerns whether or not the future of agriculture is bright. For example, mechanization in agriculture has reduced the overuse of manpower in doing some of the farming activities. As a consequence, agricultural machines have become bigger and bigger and more dedicated towards performing one type of cultivation. The introduction of autonomous agricultural vehicles, such as an autonomous tractor that is operatively connected to an agricultural machine such as a plough, is considered a next step into the future of farming and it is expected that using autonomous vehicles there is more freedom to cultivate the land using even less labour.

Self-driving cars are common these days. Based on the trends in regards to the advancement of technology, it is expected that the technology will also be used for cultivating farmland. At present farmers in advanced countries are giving a tactical approach to how they plant, harvest, as well as maintain their crops. A good example of new tactical approaches is the use of autonomous vehicles in agriculture. The concept of autonomous vehicles (form now on also denoted as autonomous tractors) can be traced back prior to the introduction of the concept of precision farming in the eighties. During these days, farmers used GPS technology as a guide to the tractors across the farmland. The aim of such an approach was the reduction of fuel consumption and enhancing the efficiency of the tractors and the farming activities. As such, these initial steps formed the basis for the development of autonomous tractors, following the introduction of technologies that improved communication over wireless devices. Autonomous tractors employ much the same approach as the driverless vehicles, i.e. using advanced control systems and sensors. With the inclusion of auto-steering abilities, such tractors have added control abilities. Evidently, the launch of the autonomous tractors is considerably a manifestation of the extended use of technology in farming.

Benefits to farmers are obvious. It is an undeniable fact that farming is not an easy undertaking, it involves working for long hours and the subscription to hard labor in harsh weather conditions. Taking into consideration the common state of farmers, the majority of them have no employees to task them in the farmland and hence, have to do everything all by themselves. The autonomous tractors can be a positive outcome. Next to this, accuracy and precision are important aspects in agriculture in various aspects such as planting. All in all, the use of such tractors may lead to higher return on investment since accuracy is enhanced.

It is generally recognized that data plays a significant role in determining the farmers' decisions. Usually, the absence of clear and reliable data can interfere with the decisions farmers make, and subsequently, have adverse impacts on the amount of outcome obtained from the fields. There are diverse sources and types of data that a farmer needs to succeed in their farming activities. For example, data on soil is important in that it helps farmers in determining what crops will do well in a given piece of land by establishing the moisture content, and the amount of nutrients. The autonomous tractors can be fitted with various sensors that can be used in the collection of data on the conditions of the soil, and hence, offer a platform for improving the outcome of the available crops. The elimination of the human interaction in farming following the use of autonomous tractors may thus be advantageous. Stressed employees cannot achieve the required efficiency level in the fields. Similarly, it is often hard for humans to manage diverse tasks on the farm especially where a large farmland is involved. Autonomous tractors have the appropriate sensors to offer the necessary help in the management of a several tasks in the farmland hence reducing stress and the workload in the farm.

The autonomous tractors run on high level technology that can be used in gathering high profile information. For example, some models have automatic steering abilities and GPS technologies which enhance the control of the tractors' course. The advanced sensors come in handy in the determination of soil moisture level, activities around planting and harvesting, present yield, as well as the amount of fuel needed for a given area of land. Additionally, other models of autonomous tractors can guide farmers on how to apply fertilizers.

Autonomous tractors allow precise control of work and farm equipment. This makes it possible for farmers to extend their working hours. The sensors fitted in the tractors can guide it in the right course even in conditions of reduced visibility and at night: work continues even during windy, dusty, and foggy conditions. Additionally, the ability of the tractors to reduce workload and stress on employees comes in handy in increased working hours in a day since the farmer has a greater flexibility in the management of growing tasks.

It has thus become a common understanding that the best way for using an autonomous vehicle is to establish a cultivation plan for the piece of farmland, which plan comprises multiple contiguous paths that extend over the piece of farmland, which paths are to be crossed by the autonomous vehicle in a predetermined order, and after the plan has been generated, controlling the autonomous vehicle such that it crosses the land by moving over each of the multiple contiguous paths according to the predetermined order. Also, the way the actual agricultural machine (which may be part of the vehicle or coupled thereto) is operated (for example its driving speed, its height with respect to the land, its angle with respect to the land etc.), is controlled using the sensor technology to adapt the predetermined plan to the particular circumstances of the moment in time the land is actually cultivated. Such circumstances can for example be objects that were not present at the piece of land at the time the plan was made, the weather conditions, etc. In particular, when a piece of farmland is sloping, thus comprises hilly areas, this has to be taken into account. In the art several solutions are provided in this respect.

JP3589736 (assigned to Yanmar Agricultural Equipment Co Lt) discloses an autonomously movable agricultural vehicle which can adjust the engine load based on the detection of an inclination sensor detecting the inclination of the vehicle in the direction of movement and which is able to stabilise and maintain the engine load by promptly anticipating the inclination of the tractor. This is accomplished by controlling the vertical position of the ground-working machine connected to the tractor based on the change in the engine load and detection of the inclination of the tractor. This way the engine load is adjusted based on the detection of the inclination. A disadvantage is that due to the adjustment needed locally, the agricultural operation is less optimal for the length of the inclined section of the path.

DE19544112 (assigned to Claas KGa GmbH) discloses a method to generate a cultivation plan from a piece of farmland, the method comprising generating three-dimensional coordinates of the piece of farmland using a GPS system, and based on those coordinates, providing a cultivation plan for the piece of farmland. It is disclosed that the three-dimensional coordinates can be used to adjust the operation of the machine depending on the local inclination of the piece of farmland. Thus, corresponding to the teaching of JP3589736, the operation itself is adjusted locally to the angle of inclination.

U.S. Pat. No. 10,474,153 (assigned to Kubota Corporation) discloses an autonomous agricultural vehicle to travel along multiple consecutive paths over a piece of farmland according to a predetermined cultivation plan, the vehicle comprising an inclination sensor, a calculator, an information generator, and a recorder. The inclination sensor is provided on the vehicle to detect a vehicle body inclination angle with respect to a horizontal line. The calculator is to calculate a position of the vehicle in the piece of farmland based on positioning data. The information generator is to output information to limit the movement of the vehicle at an inclination position on the predetermined path where the vehicle body inclination angle detected by the inclination sensor exceeds a threshold angle. The recorder is to record, as an inclined area, an area around the inclination position which is calculated based on the positioning data. Again, it is taught to adjust the performance of the predetermined plan based on measuring the angle of inclination while the farmland is being cultivated.

US2020033143 (assigned to Yanmar Co Ltd) discloses a cultivation plan generating system for an autonomous vehicle. An altitude information obtaining unit of the route generating system obtains altitude information on the piece of farmland where the autonomous travel route is to be generated, and a traveling direction setting unit thereof sets a traveling direction of the vehicle over the piece of farmland. A region setting unit of the route generating system sets, in the field, a plurality of regions including a work region where autonomous work paths in parallel with the traveling direction are generated and headlands where connection paths each connecting corresponding ones of the autonomous work paths are generated. The region setting unit sets the widths of the headlands (headland widths) based on the vehicle information, the altitude information, and the traveling direction, the widths of the headlands extending in parallel with the traveling direction. This is to prevent that the vehicle slides off its predetermined path at the headland when making the turn to another path. There is no other use of the information of the angle of inclination.

US2021168989 (assigned to Horsch Leeb Application Systems GmbH) discloses an autonomous agricultural vehicle and methods for proactively controlling the vehicle to maintain a positioning of a boom coupled to the vehicle, when crossing sloping farmland. The vehicle includes a chassis that bears components of an agricultural machine, a data processing apparatus, a sensor unit for detecting an inclination angle of the chassis relative to a reference plane, and a detection apparatus for detecting a travel speed and/or a travelled route, per time unit. Proactive control of the machine is achieved using the data processing apparatus which is configured to calculate a travelled route, in particular per time unit, using a travel speed and/or to calculate a terrain relief using a travelled route, per time unit, and using an inclination angle of the chassis which changes or remains constant along the route. Thus, the actual operation of the vehicle is adjusted depending on the sensed angle of inclination.

Object of the Invention

It is an object of the invention to devise an improved method for cultivating a piece of sloping farmland.

SUMMARY OF THE INVENTION

In order to meet the object of the invention, a method as described here above in the General Field of the Invention section has been devised, the method being improved in that a predetermined direction of movement of the autonomous vehicle over each of the paths depends on an angle of inclination of the each of these paths. So instead of adjusting the predetermined plan during actual cultivation by sensing an angle of inclination at each path, the direction of movement is determined beforehand, taking into account the angle of inclination. The angle of inclination is thus used as a criterion to determine the direction of movement of the vehicle over each of the paths when generating the cultivation plan.

The invention is based on the recognitions that by using contemporary GPS technology, three dimensional coordinates of a piece of farmland are available. So, with these data in three dimensions being available the angle of inclination at each of the paths can be determined beforehand. This way, the planning of the routing, i.e. the order and direction in which the paths are taken, can take into account this angle of inclination. This way, it can be prevented that the operation needs to be adjusted during the actual cultivation itself. For example, if for a certain path the angle of inclination is so high, that when cultivating while moving upwardly, the operation has to be adjusted in order to make sure the vehicle can continue moving and not get stuck in the farmland, the plan can be determined such that for this path the land is operated upon when the vehicle moves downwardly. So by taking into account the angle of inclination beforehand, the direction of movement can be adapted beforehand to this angle of inclination. This reduces, or maybe event prevents that the cultivation operation needs to be adjusted when actually being performed.

The invention is also embodied in a method for generating a cultivation plan for an autonomous agricultural vehicle for cultivating a piece of sloping farmland, the method comprising determining multiple contiguous paths that extend over the piece of farmland, determining an order in which the paths are to be crossed by the autonomous vehicle and determining the direction of movement of the vehicle on each of said multiple contiguous paths, wherein the direction of movement of the autonomous vehicle over each of the paths depends on an angle of inclination of the each of these paths.

The invention is also embodied in a system for generating a cultivation plan for an autonomous agricultural vehicle for cultivating a piece of sloping farmland, the system comprising a processing unit to determine multiple contiguous paths that extend over the piece of farmland, to determine an order in which the paths are to be crossed by the autonomous vehicle, and to determine the direction of movement of the vehicle on each of said multiple contiguous paths, wherein the direction of movement of the autonomous vehicle over each of the paths depends on an angle of inclination of the each of these paths.

Definitions

A tractor is an agricultural vehicle that is used cultivate land, typically by pulling or carrying agricultural machinery, and to provide the energy needed for the machinery to cultivate the land. It commonly, but not necessarily, is a powerful vehicle with a gasoline or electric engine and large rear wheels or endless belt tracks (so called caterpillar tracks).

An autonomous vehicle is a vehicle that can move over a piece of land according to a predetermined cultivation plan without a human operator controlling its movement. Such a vehicle can automatically perceive its environment, make decisions based on what it perceives and recognizes, and then actuate a movement or manipulation within that environment. These decision-based actions may include, but are not limited to, starting, stopping, and maneuvering around obstacles that are in its way. Such a vehicle can cross farmland without needing continuous control of a human operator, and thus is able to autonomously cultivate the land.

Farmland is land that is used for or suitable for farming.

Sloping farmland is farmland of which the surface is not completely horizontal, but which has coordinates that differ in vertical direction.

Contiguous means touching along a boundary, not excluding that there is overlap.

An operator of a machine or device is a human person that is trained to control this machine or device.

A cultivation plan for a tractor to cultivate a piece of land, is a plan which defines at least the position, direction and speed of the corresponding agricultural vehicle when crossing the land such that the land in essence can be cultivated completely.

Automatic means without the need of (human) operator intervention. The term automatic does not exclude that something is operator initiated or operator stopped as long the process can be completed without needing operator intervention.

EMBODIMENTS OF THE INVENTION

In a first further embodiment of the method for cultivating a piece of sloping farmland according to the invention, if the angle of inclination for a particular path is above a predetermined threshold, the predetermined direction of movement of the vehicle is downwardly over that path. It was recognised in particular that when a slope is steep there is a risk that the vehicle gets stuck when cultivating the land. This can be prevented by making sure the vehicle moves in the downward direction on such a steep slope. Although the threshold may have any value such as 1, 2, 3, 4, 5° or above, in particular, this embodiment is applied when the angle of inclination is above 5° or higher, such as 6, 7, 8, 9, 10, 11, 12, 13, 14, 15, 16, 17, 18, 19, 20° or above.

In another embodiment of the method for cultivating a piece of sloping farmland according to the invention, for each path the angle of inclination is determined over multiple consecutive sub-sections of that path. This embodiment is of particular importance when the piece of farmland does not have a smooth continuous upward inclination but has a less regular pattern of inclination. In particular, the angle of inclination of the sub-section that has the highest angle of inclination determines the direction of movement of the vehicle over that path.

In again another embodiment, the direction of movement in addition to the angle of inclination depends on the type of agricultural operation. It is recognised that for some type of agricultural operations, in particular operations wherein a lot of energy is dissipated in the land, such as with ploughing or fixed tooth cultivation, to move upwardly only when the angle of inclination is quite low, is more important than for other types of operations, such as for example sowing or spraying.

In yet a further embodiment, in which embodiment for each path the angle of inclination is determined over multiple consecutive sub-sections of that path, the cultivation plan is generated such that there is no path that comprises two sub-sections that have an angle of inclination above the threshold, wherein for one of these sub-sections the inclination is downwardly and for the other sub-section the inclination is upwardly. This is in particular advantageous when the piece of land has multiple "summits" such that when crossing the land from one border to another the land along a (straight) path is inclined upwardly as well as downwardly. To prevent that a solution in line with the invention prevents that the vehicle gets stuck, introduces the same problem downstream of the path, the path can be chosen in line with this further embodiment. This could for example mean that a path does not follow a straight line. However, as long as all paths in combination are able to cover the land, this is not disadvantageous for the cultivation of the land.

Preferably, the autonomous agricultural vehicle comprises an autonomous tractor and operatively coupled thereto an agricultural machine that performs the agricultural operation. The machine can be chosen from a group of multiple different agricultural machines. The method can be adapted to each of these different machines, in particular to the load needed to perform the respective agricultural operation for each of these machines.

It is noted that any and all embodiments as described here above or exemplified here after in the examples section for the method for cultivating a piece of sloping farmland can also be embodied in the method for generating a cultivation plan for an autonomous agricultural vehicle according to the invention, and in the system according to the invention.

The invention will now be further illustrated using the following specific examples.

DETAILED DESCRIPTION

FIG. 1

Figure 1:
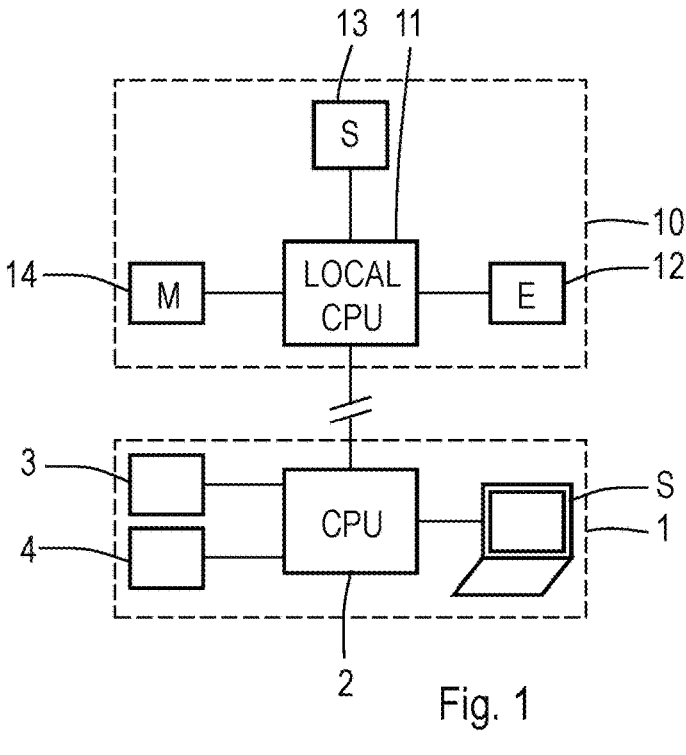
FIG. 1 schematically shows a system according to the invention.

FIG. 1 schematically shows a system 1 according to the invention. The system 1 has a central processing unit 2, that is operatively connected (wireless) to local processing unit 11 of vehicle 10. Note that any connection between electronic components as indicated in FIG. 1 can be wired or wireless as commonly known in the art. The system 1 further comprises a unit 3 that holds data regarding a piece of land to be cultivated (see FIG. 2), such as the GPS coordinates (in three dimensions), the type of soil, objects in and around the piece of land, etc. Using these data, all slopes in the piece of land can be calculated using CPU 2. Unit 4 comprises data regarding the (estimated) weather conditions and other conditions that apply during the period of time planned for cultivating the land. The CPU is connected to a computer S that can be used by a human operator to input various data needed for planning the cultivation of the piece of farmland. This process as such is known from the art. For example, a process as described in US2020033143 (introduced here above) in conjunction with FIGS. 6-11 therein. This way, the system 1 is able to generate a cultivation plan for the vehicle 10. For the actual operation to perform this plan, the local processing unit 11 of vehicle 10 is connected to engine 12 and steering unit 13. The cultivation plan as generated by system 1 is stored in unit 14 and may be adapted when needed by information provided via CPU 2 of the system. The local processing unit 11 is able to let the vehicle perform this plan via control of the engine 12 and steering unit 13.

The generation of the cultivation plan comprises the determination of multiple contiguous paths that extend over the piece of farmland (see FIG. 2), an order in which the paths are to be crossed by the autonomous vehicle, and to the direction of movement of the vehicle on each of said multiple contiguous paths. According to the invention, the direction of movement of the autonomous vehicle over each of the paths depends on an angle of inclination of the each of these paths. In more detail, based on the field information, the CPU 2 reads external shape data of the piece of farmland as received via unit 3, and generates a travel route that fits to this field and its slopes. This travel route may be generated automatically based on basic, initial parameters entered via units 3 and 4, and/or based on input parameters substantially defining a travel route entered by an operator via computer S.

FIG. 2

Figure 2:
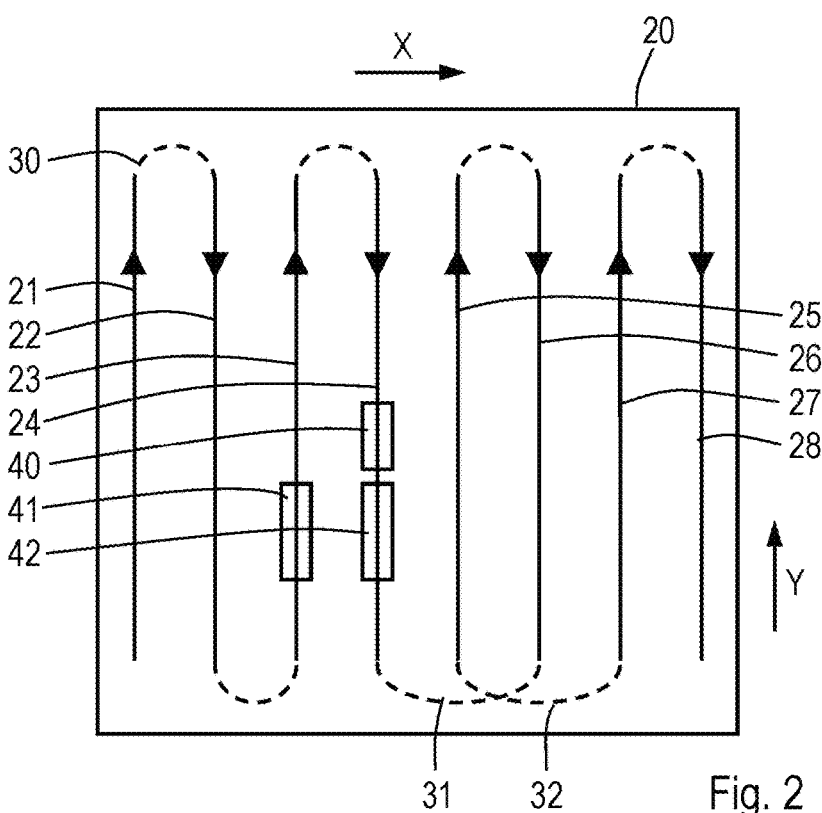
FIG. 2 schematically shows a piece of sloping farmland and a cultivation plan for this farmland.

FIG. 2 schematically shows a piece of sloping farmland 20 and a cultivation plan for this farmland. The X and Y directions for this piece of farmland are indicated. This farmland is mainly flat having only modest slopes below an angle of inclination of 3°. This is below a general threshold of 3.5° and means that any of these slopes can be crossed either in upward or downward direction without negatively interfering with any operation. There is one sub-section 40 with a slope of 5.5° downwardly in Y direction, one sub-section with a 41 with a slope of 7° upwardly in Y direction and one sub-section 42 with a slope of 8° upwardly in Y direction. Any slope above a second threshold of 6° (typical for the particular operation, viz. ploughing) is such that with the type of operation as desired in this particular case, the direction of movement of the vehicle must be downwardly in order to be able and maintain normal operation.

Therefor a cultivation plan is made comprising 8 contiguous paths 21 to 28 and headland sections 30, 31, 32 (indicated by broken curved lines along the opposite border of farmland 20 in Y direction). For each path the direction of movement for the vehicle is indicated. As can be seen, the direction of movement and order of the paths is planned such that section 41 is crossed with the vehicle going downwardly. After path 24, the headland section 31 has a larger width (in X-direction) before path 25 is crossed. This path is not directly next to path 24 to avoid that the vehicle has to cross section 42 in upward direction. By having a path 26 in between paths 24 and 25, in which path the direction of movement is in negative Y direction, section 42 is also crossed with the vehicle moving downwardly. The presence of section 40, which in this configuration of paths is crossed by the vehicle going upwardly poses no problem since the angle of inclination for this section is 5.5°, which allows normal operation with the vehicle moving upwardly. The order of crossing the paths is such that after path 26, again a wide headland section 32 is used to make sure that the next path 27 is alongside path 25, and moving in the same direction as when crossing path 25. The last path planned is path 28. This way, the paths 21 to 28 together are able to cultivate the complete piece of farmland completely.

FIG. 3

Figure 3:
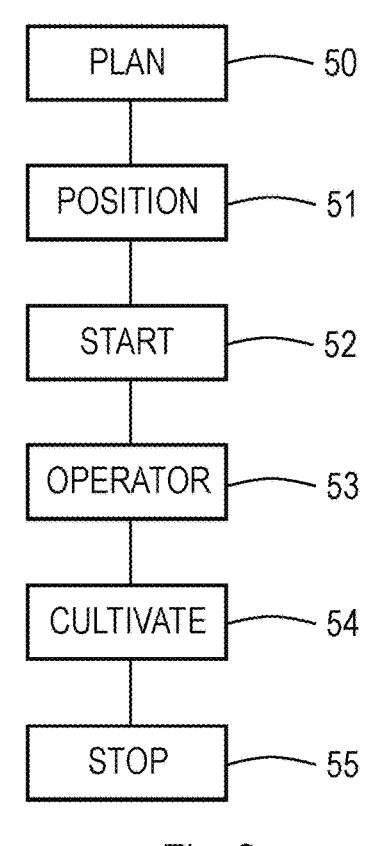
FIG. 3 is a flow diagram describing a method according to the invention.

FIG. 3 is a flow diagram describing a method according to the invention. In step 50, a cultivation plan is established to cultivate a piece of sloping farmland, in line with what was described before in conjunction with FIGS. 1 and 2. In the next step 51, a tractor coupled to an agricultural machine for autonomously performing the plan is positioned on the piece of land. The tractor is started in step 52 and operates according to the cultivation plan. Then, for the purpose of potentially fine-tuning the operation, in step 53 an operator comes near the tractor. This enables the operator to assess the quality of the cultivation according to the cultivation plan and if needed, to adapt this cultivation plan, for example to improve the quality of the cultivation. Thereafter, the tractor cultivates the piece of land in step 54 according to the cultivation plan (potentially as adapted by the human operator) until the whole piece of land is cultivated according to this plan. Ultimately, the tractor is stopped in step 55, and can be picked up to bring to another piece of farmland.

What is claimed is:

1. A method for cultivating a piece of sloping farmland using an autonomous agricultural vehicle for performing an agricultural operation to attain said cultivating, the method comprising the steps of:

generating a cultivation plan for the piece of farmland, which plan comprises multiple contiguous paths that extend over the piece of farmland, which paths are to be crossed by the autonomous vehicle in a predetermined order, and after the plan has been generated, controlling the autonomous vehicle such that it crosses the land by moving over each of the multiple contiguous paths according to the predetermined order, such that a predetermined direction of movement of the autonomous vehicle over each of the paths depends on an angle of inclination of each of these paths in a manner such that, for each said path of said contiguous paths which includes an angle of inclination greater than a predetermined angle, the autonomous vehicle is controlled to move only downwardly along said angled path.

2. A method according to claim 1, wherein for each path, determining the angle of inclination to be over multiple consecutive sub-sections of that path.

3. A method according to claim 2, further including determining the angle of inclination of the sub-section that has the highest angle of inclination to be the direction of movement of the vehicle over that path.

4. A method according to claim 1, wherein the direction of movement in addition to the angle of inclination depends on the type of agricultural operation.

5. A method according to claim 1, wherein for each path the angle of inclination is determined over multiple consecutive sub-sections of that path, generating the cultivation plan such that there is no path that comprises two sub-sections that have an angle of inclination above the threshold, wherein for one of these sub-sections the inclination is downwardly and for the other sub-section the inclination is upwardly.

6. A method according to claim 1, wherein the autonomous agricultural vehicle comprises an autonomous tractor which is operatively coupled thereto an agricultural machine that performs the agricultural operation.

7. A method for cultivating a piece of sloping farmland using an autonomous agricultural vehicle for performing an agricultural operation to attain said cultivating of a piece of sloping farmland, the method comprising the steps of:

generating a cultivation plan for the piece of farmland, which plan comprises the steps of:

determining multiple contiguous paths that extend over the piece of farmland, determining an order in which the paths are to be crossed by the autonomous vehicle and determining the direction of movement of the vehicle on each of said multiple contiguous paths, wherein the direction of movement of the autonomous vehicle over each of the paths depends on an angle of inclination of each of these paths; and after the plan has been generated, controlling the autonomous vehicle such that it crosses the land by moving over each of the multiple contiguous paths according to the order, such that a predetermined direction of movement of the autonomous vehicle over each of the paths depends on the angle of inclination of each of these paths in a manner such that, for each said path of said contiguous paths which includes an angle of inclination greater than a predetermined angle, the autonomous vehicle is controlled to move only downwardly along said angled path.

8. A system for cultivating a piece of sloping farmland using an autonomous agricultural vehicle for performing an agricultural operation to attain said cultivating of a piece of sloping farmland, the system comprising:

a processing unit to:

determine multiple contiguous paths that extend over the piece of farmland, determine an order in which the paths are to be crossed by the autonomous vehicle, determine the direction of movement of the vehicle on each of said multiple contiguous paths, wherein the direction of movement of the autonomous vehicle over each of the paths depends on an angle of inclination of the each of these paths, and control the autonomous vehicle such that it crosses the land by moving over each of the multiple contiguous paths according to the order, such that a predetermined direction of movement of the autonomous vehicle over each of the paths depends on the angle of inclination of the each of these paths in a manner such that, for each said path of said contiguous paths which includes an angle of inclination greater than a predetermined angle, the autonomous vehicle is controlled to move only downwardly along said angled path.

\* \* \* \* \*